United States Patent [19]

Baer

[11] 4,275,712

[45] Jun. 30, 1981

[54] SUN TRACKING DEVICE EMPLOYING DISPLACED HEATING SURFACES FOR AUTOMATIC MORNING REORIENTATION

[76] Inventor: Stephen C. Baer, P.O. Box 712, Albuquerque, N. Mex. 87103

[21] Appl. No.: 88,016

[22] Filed: Oct. 25, 1979

[51] Int. Cl.³ .......................... F24J 3/02; G03B 21/00
[52] U.S. Cl. ........................................ 126/425; 353/3
[58] Field of Search ...................... 250/203 R; 353/3; 126/424, 425; 60/641

[56] References Cited

U.S. PATENT DOCUMENTS

| | | | |
|---|---|---|---|
| 1,976,428 | 10/1934 | Arthuys et al. | 353/3 |
| 2,999,943 | 9/1961 | Geer | 60/641 |
| 4,027,651 | 6/1977 | Robbins | 126/425 |
| 4,063,543 | 12/1977 | Hedger | 353/3 |
| 4,079,249 | 3/1978 | Glynn | 126/424 |
| 4,122,827 | 10/1978 | Rhodes | 353/3 |
| 4,132,223 | 1/1979 | Reddell | 60/641 |
| 4,185,615 | 1/1980 | Bottum | 126/424 |
| 4,198,954 | 4/1980 | Meijer | 126/425 |

FOREIGN PATENT DOCUMENTS 1192769  4/1959  France ........................................ 353/3

Primary Examiner—Daniel J. O'Connor
Attorney, Agent, or Firm—Townsend and Townsend

[57] ABSTRACT

The present invention is a device for rotating a collector of solar energy in such a way as to keep it constantly oriented during the day in the best direction for interception of radiation and for returning it to a position from which it will begin collecting radiation again in the morning. Whereas a previously disclosed device for automatic return to morning position relies upon changing the rate of heat loss from the surfaces of the interconnected canisters which power it, the present invention removes the heat-collecting surfaces whose differential heating by the west-moving sun controls the tilting of the collector from the canisters themselves to plates located below and on sides opposite the canisters served so as to give these surfaces a larger view of the sky and enable them to find the sun from almost any position.

11 Claims, 7 Drawing Figures

SUN TRACKING DEVICE EMPLOYING DISPLACED HEATING SURFACES FOR AUTOMATIC MORNING REORIENTATION

REFERENCES (1) U.S. Pat. No. 2,999,943, Geer, September, 1961.
(2) Patent Pending, "Self Reorienting Solar Tracker", Baer, 1977.

BACKGROUND OF THE INVENTION

Geer, [Ref. 1] presents a method for constructing a device capable of maintaining a collector of solar energy in the best position for interception of the sun's rays during the course of the day without relying either on outside energy or on the energy gathered by the collector itself. This method consists of mounting a pair of interconnected containers filled with enough low boiling-point liquid to fill one container on opposite edges of and perpendicular to a collector pivoting on a fixed axis. The containers have shields extending above them on their outer sides in such a way that, when the sun's rays are normal to the collector surface, each container will receive the same amount of radiation. When, owing to the sun's westerly movement, the rays are no longer normal to the collector, the container that is farther from the sun will receive a larger amount of radiation and become warmer than the container that is closer to the sun, which will be shaded by its shield. Vaporization in the warmer container will then transfer liquid to the cooler container, causing the apparatus to tilt until both containers are once again receiving equal amounts of radiation, that is, until the sun's rays are once again normal to the collector surface.

A disadvantage in this embodiment of the method is that each container's view of the sky at any one time is limited to about 90° of arc. After sundown, the collector will remain facing the last position from which the sun caused transfer of liquid, and in the morning the whole apparatus must either be reset manually or, as a consequence of the restricted field of view, wait until the sun's rays are high enough above the shield on the eastern container to strike the western container. When this occurs, the western container will transfer liquid to the eastern one until the collector has tipped back into a position from which it can begin tracking, but in the meantime a substantial portion of morning radiation will have gone uncollected.

A method of overcoming this disadvantage has been disclosed by Baer [Ref. 2]. In this method, interconnected elongated canisters containing the volatile liquid are mounted parallel to the collector surface and, as in the method just described, are shielded with shadow bars so as to allow differential heating and consequent transfer of liquid and tilting of the collector with the sun's westerly movement. In addition, however, they are provided with different rates of heat loss by such means as painting them different colors or partially insulating one but not the other so that, when the sun disappears, one will lose heat more slowly than the other and, being warmer, transfer liquid to it. When the canister with the lower rate of heat loss is mounted on the west side of the collector, the transfer of liquid that occurs after sundown will automatically tilt the collector back to an east-facing position so that it can begin collecting energy upon the sun's reappearance the following morning.

A disadvantage in this method of providing automatic reorientation is that differential heat loss may sometimes be impeded by weather conditions, as, for instance, when cloud cover keeps the temperature of the night sky so close to the temperature of the air surrounding the canisters that they do not achieve a sufficient temperature differential to transfer the quantity of liquid required to tip the collector from a west-facing back to an east-facing position.

Like the differential heat-loss method, that of the present invention provides a canister-powered sun tracking device with a means of resetting itself for interception of morning sunlight, but without alteration of or essential reliance upon the heat-loss rates of the canister surfaces. Instead, the heat-collecting surfaces which control the transfer of liquid between canisters are displaced from the canisters themselves to plates connected to them by tubing and located below and on sides opposite the canisters they serve. These plates transfer heat to their canisters by convection and, because of the larger view of the sky afforded them, can find the reappearing sun from almost any position. Because the sun-tracking ability of the pair of canisters no longer depends upon the sun's striking the surface of the canister farther from it while the canister closer to it is being shaded, it is now possible to insulate the canisters completely and to reply entirely on the plates for the differential heating that is required. It is also possible, however, to leave the canister surfaces exposed and fitted with shadow bars as previously described and to use a single heating surface primarily as a means of resetting the tracking device to an east-facing position when the sun appears in the morning.

DESCRIPTION OF THE PREFERRED EMBODIMENT

Figure 1:
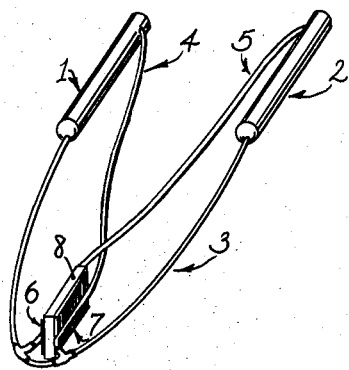
FIG. 1 is a perspective view of the canisters, copper tubing and heating plates which, when connected and arranged as shown, form the basis of the automatically-returning sun-tracking device.

Referring now to FIG. 1, a pair of canisters, 1 and 2, are filled with enough readily vaporizable liquid such as refrigerant 12 (dichlorodifluoromethane) to fill one canister and are connected at corresponding ends by a copper tube, 3, while to their other ends are attached copper tubes, 4 and 5, which are soldered to thin copper plates, 6 and 7, and then attached to tube 3. Tubes 4 and 5 are so attached as to extend below the interconnected ends of canisters 1 and 2 and to cross over each other in such a way that when the canisters are pointed to the north, the canister, 1, on the west side will be connected by tube 4 to an east-facing plate, 7, while the canister, 2, on the east side will be connected by tube 5 to a west-facing plate, 6. Plates 6 and 7 are painted flat black so as to absorb maximum sunlight and are mounted on opposite sides of an insulating barrier, 8, to prevent heat transfer between them.

Figure 2:
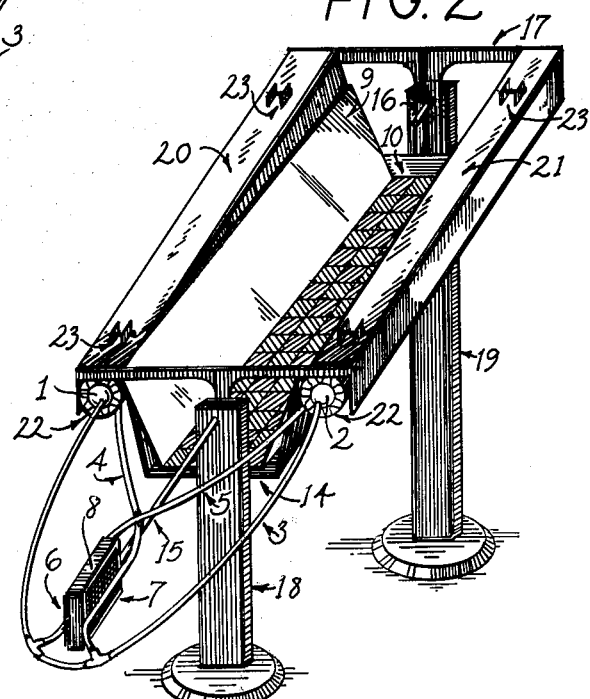
FIG. 2 is a perspective view of a collector of solar energy on which the apparatus of FIG. 1 has been mounted.
Figure 3:
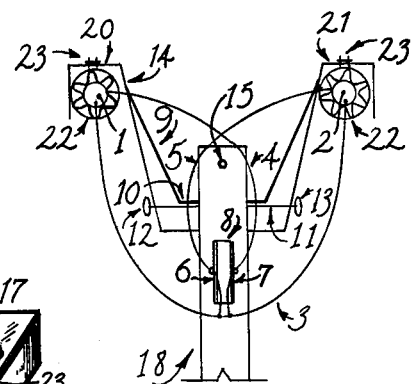
FIG. 3 is a diagrammatic cross-section of the invention as embodied in FIG. 2.

Referring now to FIGS. 2 and 3, the apparatus of FIG. 1 is shown fitted onto a collector of solar energy consisting of a reflective trough, 9, having at its base an array, 10, of photovoltaic cells for the conversion of sunlight into electricity. The reflectors and cells form no part of the present invention and are shown only to illustrate application of it. It will be obvious to those skilled in the art that any of several types of devices for the collection of solar energy could be employed in the embodiment, and, accordingly, the use of solar collectors of any kind with the suntracking and reorientation device herein described should be construed as falling within the spirit and scope of the present invention. Reflective trough 9 is capable of at least 23 ½° of manual rotation on either side of an east-west axis, shown in FIG. 3 as a horizontal rod, 11 threaded at its ends and fitted with tightening handles, 12 and 13, so that the turning collector can be kept perpendicular to the sun's rays as the sun's declination changes during the course of the year, and is fitted by means of this rod into a frame, 14, which pivots upon a north-south axis by means of pins, 15 and 16, which extend from the supporting framework, 17, of frame 14 and are so located with respect to the apparatus' moving center of gravity that the apparatus rotates through an angle somewhat less than 180° as the liquid is transferred from one canister to the other. Pins 15 and 16 protrude through holes near the tops of vertical supports, 18 and 19, which can be set into the ground or otherwise made rigid at the north and south ends of the collector and associated framework, and whose relative heights can be so adjusted that, at the latitude at which the apparatus is installed, the axis formed by pins 15 and 16 will be parallel to the polar axis of the earth. Attached to or integral with the sides of frame 14 are channels, 20 and 21, into which canisters 1 and 2, wrapped in insulation, 22, are inserted and fastened in place with clamps, 23, in a position such that tube 3 connecting the canisters is at their low ends, and tubes 4 and 5 are connected near their high ends. The insulating barrier, 8, separating plates 6 and 7 is affixed to the extended end of pivot-pin 15 and plates 6 and 7 are fastened to it in such a way that, when the apparatus is in the position shown in FIGS. 2 and 3, plate 7, connected by tube 4 to canister 1, faces east while plate 6, connected by tubing 5 to canister 2, faces west.

Figure 4:
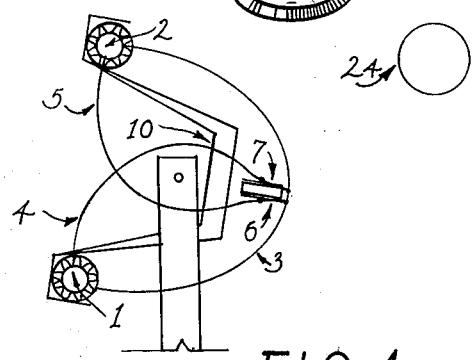
FIGS. 4 and 5 are diagrammatic cross-sections similar to FIG. 3 but showing the embodied invention in morning and evening positions.

Referring now to FIG. 4, which shows the apparatus in the west-facing position it will occupy between sunset of one day and sunrise of the next, the morning sun, 24, warms plate 7 causing it to transfer heat through tube 4 to canister 1 by convection.

Figure 5:
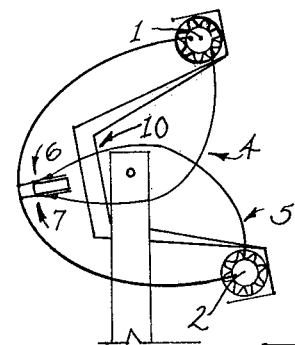

Referring now to FIG. 5, canister 1, becoming warmer than canister 2, causes liquid to travel to it through tube 3. As canister 2 grows heavier than canister 1, it causes the apparatus to rotate from west back to east so that, after the sun has moved a sufficient distance west, collector 10 will be facing it. Plate 6 will now be more exposed to the sun than plate 7 and therefore will begin transferring heat through tube 5 to canister 2, which will grow warmer than canister 1 and transfer liquid to it, causing the apparatus to begin rotating back toward the west until the plates are equally exposed to the sun and to continue this rotation at the same rate as the sun's movement across the sky. Should it rotate too far, getting ahead of the sun, it will thereby move the surface of plate 6 out of the sun and expose the surface of plate 7, which, by transferring heat to canister 1, will cause liquid to flow back to canister 2 and rotate the apparatus eastward until the two plates are once again equally exposed to the sun and the collector is again properly oriented. Similarly, should temporary cloud cover allow the sun to get ahead of the apparatus, plate 6 will be exposed to the sun upon its reappearance and transfer heat to canister 2, which will transfer liquid to canister 1 and cause the apparatus to rotate eastward until proper orientation is again achieved.

Figure 6:
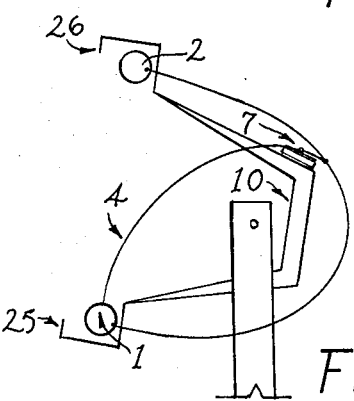
FIGS. 6 and 7 are cross-sections showing slightly different embodiments of the invention, in which the primary function of the displaced heating surface is morning reorientation of the collector, the main burden of diurnal sun-tracking being carried by the canisters, which are here shown with shadow bars.

Referring now to FIG. 6, in which only the morning reorientation feature of the invention is embodied, west-facing plate 6, tube 5, and insulation 22 have been eliminated, and channels 20 and 21 have been replaced with shadow-bars, 25 and 26. Plate 7, now located on the east side of frame 14, is connected by tube 4 to canister 1 just as in the embodiment previously described, and is responsible for morning reorientation of the collector. Now, however, diurnal rotation of the apparatus takes place by methods prior to those of the present invention, that is, differential shading of the canisters by shadow-bars 25 and 26 causes their exposed surfaces to undergo differential heating with consequent westward tipping of the apparatus until the collector is facing west at sundown, and heating of plate 7 causes it to face east again after sunrise.

Figure 7:
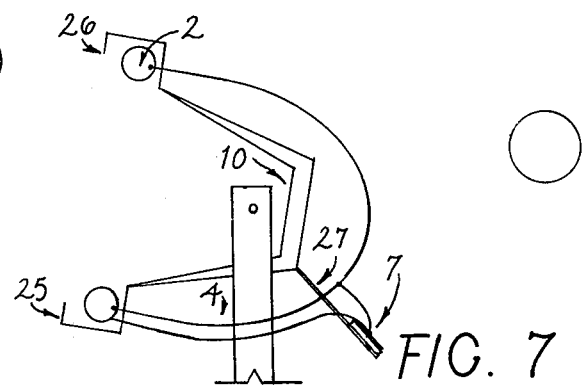

Referring now to FIG. 7, it is to be understood that the present invention is intended to be usable at any latitude on the earth where collection of solar energy is desirable. Whereas the modifications necessary for proper functioning of the invention in the Southern Hemisphere relate only to those changes in the gross orientation of the apparatus which are necessary when the sun is in the northern rather than the southern part of the sky and which will be obvious to those skilled in the art, employment of the invention at equatorial or near-equatorial latitudes requires a special modification, which will now be described.

Because heat-transfer from heat-absorbing plates to canister occurs by convection, the plate must be lower than the canister to which it is connected. This requirement is automatically provided for when the latitude at which the apparatus is installed is such that the polar axis about which the collector must rotate in order to remain perpendicular to the sun's rays forms an appreciable angle with the horizontal, because the far end of the canister to which the plate is connected will then be higher than the end near to which the plate is located. Because the earth's polar axis at the Equator is parallel to the horizon, however, the turning axis must also be horizontal there. FIG. 7 shows a method by which a heat-absorbing plate for morning reorientation of a collector may be located so as to allow heat to travel by convection to a horizontal canister. An extension, 27, is fastened to the west corner of frame 14 and plate 7, connected to canister 1 by tube 4, is fastened to it in such a way that, when the apparatus has tipped as shown to face the setting sun, plate 7 will be in a position to face the rising sun and yet be lower than canister 1. Heating of plate 7 by the morning sun will then cause reorientation of the apparatus even though the canisters are horizontal, and it can then track the sun as previously described.

What is claimed is:

1. In a solar tracking mechanism in which a solar collector is pivotably mounted to move about a generally north-south axis and includes a pair of interconnected east and west spaced canisters containing a volatile liquid which is transferred between the canisters based upon heat influx to keep the collector pointed toward the sun as it moves through the sky from east to west during the day, the improvement comprising a solar heat receiving means oriented at least partially toward the east horizon at all times during movement of the collector, and means for providing heat transfer from the heat receiving means to the west canister so that heat from the early morning sun raises the temperature in the west canister resulting in a mass transfer of the volatile fluid from the west canister to the east canister to pivot the collector toward the morning sun.

2. The mechanism of claim 1 in which the canisters are shielded about their entire periphery from solar energy direct from the sun and wherein the improvement includes a second solar heat receiving means mounted back to back to the first solar heat receiving means and thermally insulated therefrom, and means for providing heat transfer from the second solar heat receiving means to the east canister.

3. The mechanism of claim 2 wherein the first and second solar heat receiving means are attached to the collector at its axis of rotation.

4. The mechanism of claim 1 wherein the canisters are only partially shielded from solar energy direct from the sun by shadow bars.

5. The mechanism of claim 1 wherein the heat receiving means comprises a plate of heat conductive material.

6. The mechanism of claim 1 wherein the heat transfer providing means comprises a tube.

7. In a solar tracking mechanism in which a solar collector is pivotably mounted to move about a generally north-south axis and includes a pair of interconnected east and west spaced canisters containing a volatile liquid which is transferred between the canisters based upon heat influx to keep the collector pointed toward the sun as it moves through the sky from east to west during the day, the improvement comprising:
    means for shielding the canisters about their entire periphery from solar energy direct from the sun;
    an east-facing heat receiving means mounted to the collector and pivotable therewith so that said east-facing heat receiving means faces at least partially east during the movement of the collector and is shielded so as to be exposed to the direct influx of solar energy only through an arc defined as no more than the east side of a plane bisecting the collector through its north-south pivotal axis;
    a west-facing heat receiving means mounted to the collector and pivotably therewith so that said west-facing heat receiving means faces at least partially west during the movement of the collector and is shielded so as to be exposed to the direct influx of solar energy only through an arc defined as no more than the west side of a plane bisecting the collector through its north-south pivotal axis; and
    means for providing heat transfer between the east-facing heat receiving means and the west canister and the west-facing heat receiving means and the east canister so that an increase in solar heating of one of the heat receiving means relative to the other causes a mass transfer of volatile fluid to align the collector with the sun.

8. The mechanism of claim 7 wherein the respective heat receiving means are mounted back to back, and additionally comprising means for thermally insulating the heat receiving means from one another.

9. The mechanism of claim 8 wherein the respective heat receiving means are mounted to the solar collector along the pivotal axis of said collector.

10. The mechanism of claim 7 wherein the canisters are elongate and are inclined upwardly along their length, and wherein the heat transfer providing means comprises a transfer tube interconnecting the lowermost ends of the respective canisters and passing in close proximity to the respective heat receiving means, and a pair of tubes emanating from the first tube, passing in thermal contact with the east facing and west facing heat receiving means, respectively, and on to the uppermost ends of the west and east canisters respectively.

11. In a solar tracking mechanism in which a solar collector is pivotably mounted to move about the generally north-south axis and includes a pair of interconnected east and west spaced canisters containing a volatile liquid which is transferred between the canisters based upon heat influx to keep the collector pointed toward the sun as it moves through the sky from east to west during the day, the improvement comprising a plate of heat conductive material oriented at least partially toward the east horizon at all times during movement of the collector and shielded so as to be exposed to the direct influx of solar energy only through an arc defined as no more than the east side of a plane besecting the collector through its north-south pivotal axis, a transfer tube interconnecting the respective canisters at one end thereof, and another tube interconnecting said plate with the other end of the west canister so that heat from the early morning sun raises the temperature of the plate and heat is transfered to the west canister resulting in a mass transfer of the volatile fluid from the west canister to the east canister to pivot the collector toward the morning sun.

* * * * *